United States Patent [19]

Teshima

[11] Patent Number: 5,101,146
[45] Date of Patent: Mar. 31, 1992

[54] DEVICE FOR CORRECTING MECHANICAL ERRORS IN NC MACHINE

[75] Inventor: Takeo Teshima, Aichi, Japan

[73] Assignee: Mitsubishi Denki K.K., Tokyo, Japan

[21] Appl. No.: 563,390

[22] Filed: Aug. 7, 1990

[30] Foreign Application Priority Data

Aug. 10, 1989 [JP] Japan .................................. 1-205727

[51] Int. Cl.$^5$ .................................................. G05B 19/00
[52] U.S. Cl. ................................... 318/572; 318/571; 318/603; 318/561
[58] Field of Search ................................... 318/560–646

[56] References Cited

U.S. PATENT DOCUMENTS

| | | | |
|---|---|---|---|
| 3,555,252 | 1/1971 | Garden | 318/18 |
| 3,766,461 | 10/1973 | Leenhouts | 318/630 |
| 3,794,902 | 2/1974 | Nishimura et al. | 318/630 |
| 3,886,424 | 5/1975 | Hoshina et al. | 318/630 |
| 4,196,380 | 4/1980 | Gustavsson et al. | 318/630 |
| 4,604,560 | 8/1986 | Inagaki et al. | 318/567 |
| 4,743,823 | 5/1988 | Fujita | 318/630 |
| 4,792,738 | 12/1988 | Yamazaki et al. | 318/630 |
| 4,800,325 | 1/1989 | Nakanishi | 318/605 |
| 4,961,034 | 10/1990 | Kakino et al. | 318/600 |
| 5,008,605 | 4/1991 | Ohara et al. | 318/630 |

FOREIGN PATENT DOCUMENTS

| | | |
|---|---|---|
| 52-63578 | 5/1977 | Japan . |
| 59-36808 | 2/1984 | Japan . |
| 59-81705 | 5/1984 | Japan . |

Primary Examiner—Paul Ip
Attorney, Agent, or Firm—Sughrue, Mion, Zinn, Macpeak & Seas

[57] ABSTRACT

A device for correcting mechanical errors in an NC machine, by which an incremental amount of movement of a control shaft is corrected for mechanical errors such as backlash and lost motion and the value thus corrected is transmitted to a servo control section. The incremental amount of movement of the control shaft calculated every sampling is subjected to a speed adjustment. A position command value is calculated by progressively adding a command value of the incremental amount of movement subjected to a speed adjustment. A position command correction value is obtained by adding a predetermined amount of correction for mechanical error to the position command value. A corrected incremental amount of movement is calculated by substracting a previously calculated position command correction value, and is transmitted to the servo control section.

3 Claims, 7 Drawing Sheets

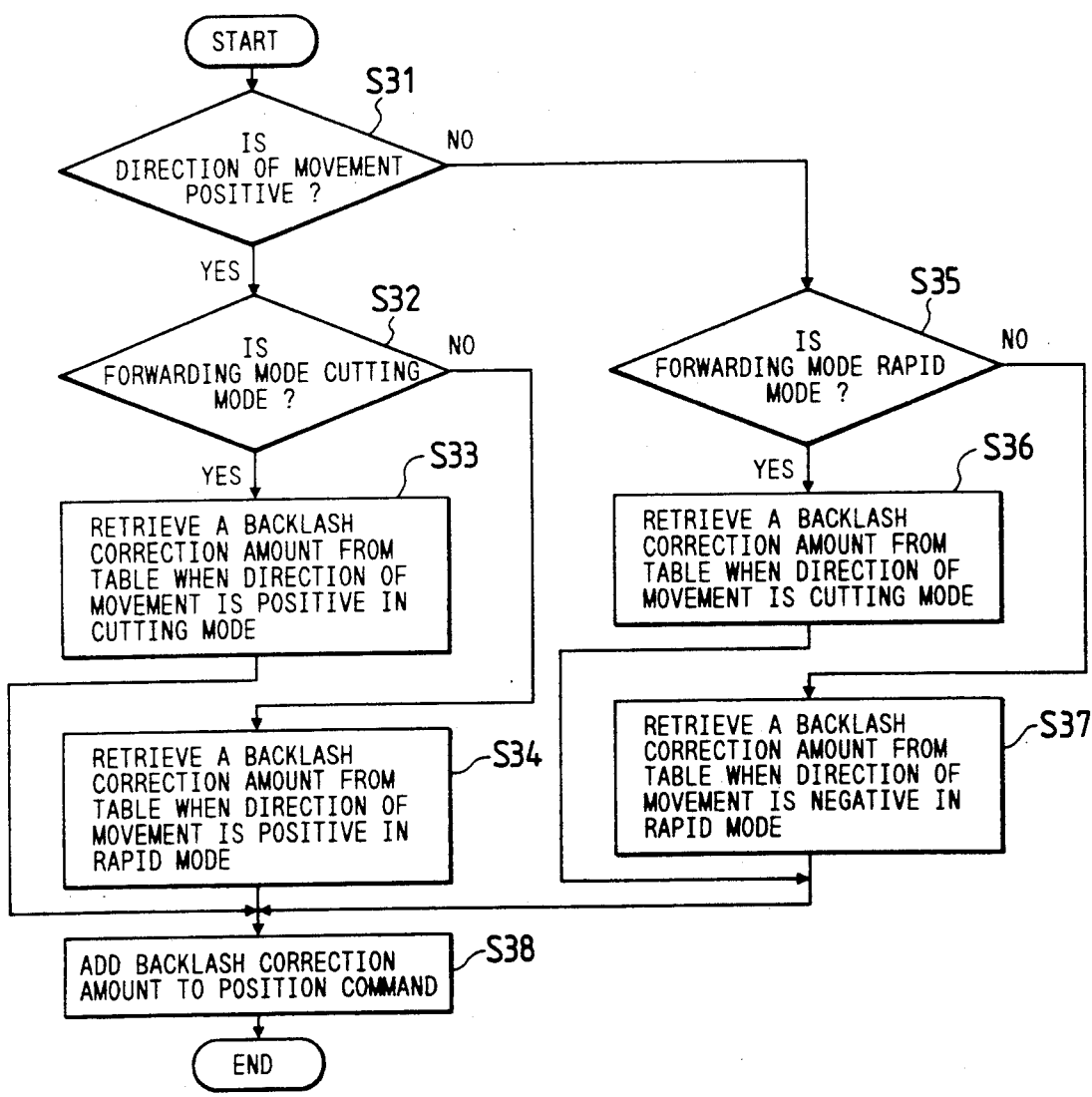

DEVICE FOR CORRECTING MECHANICAL ERRORS IN NC MACHINE

BACKGROUND OF THE INVENTION

1. Field of the Invention

This invention relates to a device for correcting mechanical errors in an NC machine, and more particularly to positioning accuracy.

2. Description of the Related Art

In order to improve the accuracy of repetitive positioning in operating an NC machine, mechanical errors such as backlash and lost motions, inherent in mechanical systems, must be corrected. Mention has been made as to the correction of mechanical errors in, e.g., Japanese Patent Application (UPA) Nos. 36808/1977 and 36808/1984 (the term "UPA" as used herein means "unexamined published application").

FIG. 6 is a block diagram showing an example of a control system for correcting backlash in a conventional NC machine. In the figure, interpolation processing means produces an incremental amount of movement of a control shaft of the NC machine by means of approximation every sampling time. Speed adjustment processing means is for multiplying the interpolated incremental amount of movement by an adjusting speed to thereby calculate a command value of the incremental amount of movement, and servo control section 3 controls a servomotor 31 by receiving the command value of incremental amount of movement of the control shaft calculated every sampling and transmitted from the speed adjustment processing means 2.

The servo control section 3 causes a subtracting unit 33 to calculate the difference between the received command value of the incremental amount of movement calculated every sampling and the position feedback value detected every sampling; causes an adding unit 34 and an integrating unit 35 to accumulate the calculated differences progressively. In addition a multiplying unit 36 multiplies the progressively accumulated value by a position loop gain Kp. The value thus multiplied is the speed command. This speed command is received by a speed loop control section comprising a speed control amplifier 37 and a speed detector 38 and is further subjected to a current loop control by an amplifier 39 for position-controlling the servomotor 31.

Reference numeral (4) designates a memory table containing backlash correction amounts B to be added upon change of direction of the control shaft. The memory table 4 comprises, a table 4a containing backlash correction amounts Bcr that are used in the case where the forwarding mode switches from the rapid mode to the cutting mode and vice versa. A table 4b containing backlash correction amounts Bc that are used when the forwarding mode, which is the cutting mode, does not change and thus the cutting mode continues and a table 4c containing backlash correction amounts Br that are used when the forwarding mode, which is the rapid mode, remains unchanged as the direction of movement changes. Reading means 5 selects the backlash correction amount by switching the respective tables 4a to 4c of the memory table 4; and 6, transfer means transmits the backlash correction amount to the adding unit (8).

An operation of the control system for backlash correction in the NC machine thus constructed will next be described with reference to the flowchart shown in FIG. 7.

The interpolation processing means 1 approximates an incremental amount of movement of the control shaft from a machining configuration every sampling and applies the approximated amount to the speed adjustment processing means 2 which then subjects the applied incremental amount of movement of the control shaft to a speed adjustment process to thereby calculate a command value of incremental amount of movement and apply it to the adding unit 7. At this time, a central processing unit (CPU) 12 judges whether or not the direction of movement is inverted (Step S71). If not, there will be no backlash correction because the movement is continuous in the same direction and thus the command value of incremental amount of movement is directly applied to the servo control section 3 to thereby position-control the motor 31.

If the direction of movement is inverted as the result of the speed adjustment processing, it is judged whether the forwarding mode immediately before the inversion is the rapid mode or the cutting mode (Step S72). If it is the cutting mode, then it is judged whether the forwarding mode immediately after the inversion is the cutting mode or the rapid mode (Step S73). If it is still the cutting mode, a backlash correction amount Bc for the cutting mode is retrieved from the table 4b by the reading means 5 (Step S74).

If the forwarding mode immediately before the inversion of the direction of movement is the rapid mode in Step S72, it is judged whether the forwarding mode immediately after the inversion is the rapid mode or the cutting mode (Step S75). If the rapid mode continues, a backlash correction amount Br is retrieved from the table 4c (Step S76).

If the forwarding mode before and after the inversion of the direction of movement switches from the cutting mode to the rapid mode or vice versa (Steps S73 and S75), a backlash correction amount Bcr to be applied when the mode is changed is retrieved from the table 4a (Step S77).

After retrieving the backlash correction amount corresponding to the forwarding mode before and after the inversion of the direction of movement from the table 4 in this way, it is judged whether the direction of movement after the inversion is positive or negative by the transfer means 6 (Step S78). If it is negative, the sign of the retrieved backlash correction amount is made negative (Step S79). Otherwise, its sign remains unchanged, and either the positive or negative backlash correction amount as appropriately processed is applied to the adding unit 7 so that it will be added to the command value of incremental amount of movement supplied from the speed adjustment processing means 2 (Step S80). This ends the backlash correction amount processing. This process is performed every sampling, and thus the backlash corrected-command value of incremental amount of movement is applied to the servo control section 3 to perform position control of the motor 31.

FIGS. 8(a), 8(b) and 8(c) are explanatory diagrams showing the operation of the control shaft at its respective inverting points when the above-described conventional backlash correction has been made. FIGS. 8(a) and 8(b) show the case where the control shaft moves from point A to point B; the direction of its movement is inverted twice at point B and point C; and then the control shaft resumes its movement up to point D. FIG. 8(a) shows a case of the movement between point A and point D in the cutting mode, FIG. 8(b) in the rapid mode, respectively. FIG. 8(c) shows the case where the control shaft moves in the cutting mode from point A to point B; the direction of its movement is inverted twice first at point B and then at point C; the control shaft moves in the rapid mode from point C to point D; the direction of its movement is inverted at point D and then at point E; and the control shaft further moves up to point F in the cutting mode.

When the control shaft moves through the path of points A, B, C, and D in the cutting mode as shown in FIG. 8(a) and if it is supposed that the initial value EB of a progressive value of backlash correction amounts at point A is zero, a backlash correction amount $-Bc$ is added to the command value of incremental amount of movement at point B. At point C, a backlash correction amount Bc is added to the command value of incremental amount of movement to thereby make the progressive value $\Sigma B$ of the backlash correction amounts at point D equal to zero. Likewise, when the control shaft moves through the path of points A, B, C, and D in the rapid mode as shown in FIG. 8(b) and if it is supposed that the initial value $\Sigma B$ of a progressive value of backlash correction amounts at point A is zero, a backlash correction amount $-Br$ is added to the command value of incremental amount of movement at point B. At point C, a backlash correction amount Br is added to the command value of incremental amount of movement to thereby make the progressive value EB of the backlash correction amounts at point D equal to zero.

When the control shaft moves from point A to point B in the cutting mode, then through points B, C, and D in the rapid mode, and through points D, E, and F in the cutting mode again and if it is supposed that the initial value $\Sigma B$ of a progressive value of backlash correction amounts at point A is zero, a backlash correction amount $-Bcr$ is added to the command value of incremental amount of movement at point B. At point C, a backlash correction amount $-Br$ is added to the command value of incremental amount of movement, and at point D a correction of $-BCR$ is added, a backlash correction amount Bc is added to the command value of incremental amount of movement at point E to thereby make the progressive value $\Sigma B$ of the backlash correction amounts at point F equal to $Br+Bc-Bcr-Bcr$. Since the progressive value $\Sigma B$ of the backlash correction amounts at point F must be zero, it is necessary to store the backlash correction amount Bcr when the forwarding mode is changed, which is equal to $(Br+Bc)/2$, in the table (4a).

Since a device for correcting mechanical errors such as backlash in a conventional NC machine is constructed as described above, it is necessary to judge the conditions including the forwarding mode before and after the inversion of the direction of movement. Of course, the larger the number of such conditions, the more complicated the process becomes.

Since the amount of correction of a mechanical error such as backlash is added to its command value (speed command), if corrections are to be made repetitively, it is necessary to calculate each correction amount and store it in the memory table so that the mechanical locus will not be deviated due to control points being erroneously positioned, and this complicates the preparation of the memory table.

Further, when the control shaft moves from point A to point B in the cutting mode; from point B to point G in the rapid mode; and through points G, C, and D in the cutting mode as shown in FIG. 9 and if it is supposed that the initial value EB of a progressive value of backlash correction amounts at point A is zero, the progressive value $\Sigma B$ of the backlash correction amounts at point D is $Bc-Bcr$. Thus, in order to make the progressive value EB equal to zero at point D, it is necessary to add a correction amount, $(Bcr-Bc)$ at point G, thereby requiring that not only changes in the direction of movement but also the changes in forwarding modes must be judged for accurate correction.

In the case where mechanical errors such as lost motions which involve continuous changes caused by forwarding speeds and lubricating conditions of guiding surfaces of the machine are corrected, the conventional method of adding the mechanical error correction amount to the command value of the incremental amount of movement required a complicated process of preventing deviations at each control point.

SUMMARY OF THE INVENTION

This invention has been made to overcome the above problems and has as an object the provision of a device for correcting mechanical errors in an NC machine capable of not only performing the correction with a simple process but also improving its positioning accuracy.

The device for correcting mechanical errors according to this invention calculates a position command value by progressively adding a command value of incremental amount of movement which has been obtained by subjecting an incremental amount of movement of the shaft obtained every sampling time to a speed adjustment by position command value calculation means. Then, a position command correction value is calculated by adding a predetermined amount of correction of a mechanical error to the position command value calculated by adding means. Then, a corrected incremental amount of movement is calculated by subtracting a previously sampled position command correction value from a currently sampled position command correction value, and this corrected incremental amount of movement is applied to a servo control section as a target value.

In this invention, the amount of correction of a mechanical error is added to a position command value of the control shaft every sampling, thereby preventing the amount of correction from being accumulated even in the case where corrections are to be made repetitively.

BRIEF DESCRIPTION OF THE DRAWINGS

FIG. 3 is a flowchart showing an operation of the embodiment.

DETAILED DESCRIPTION OF THE PREFERRED EMBODIMENTS

Figure 1:
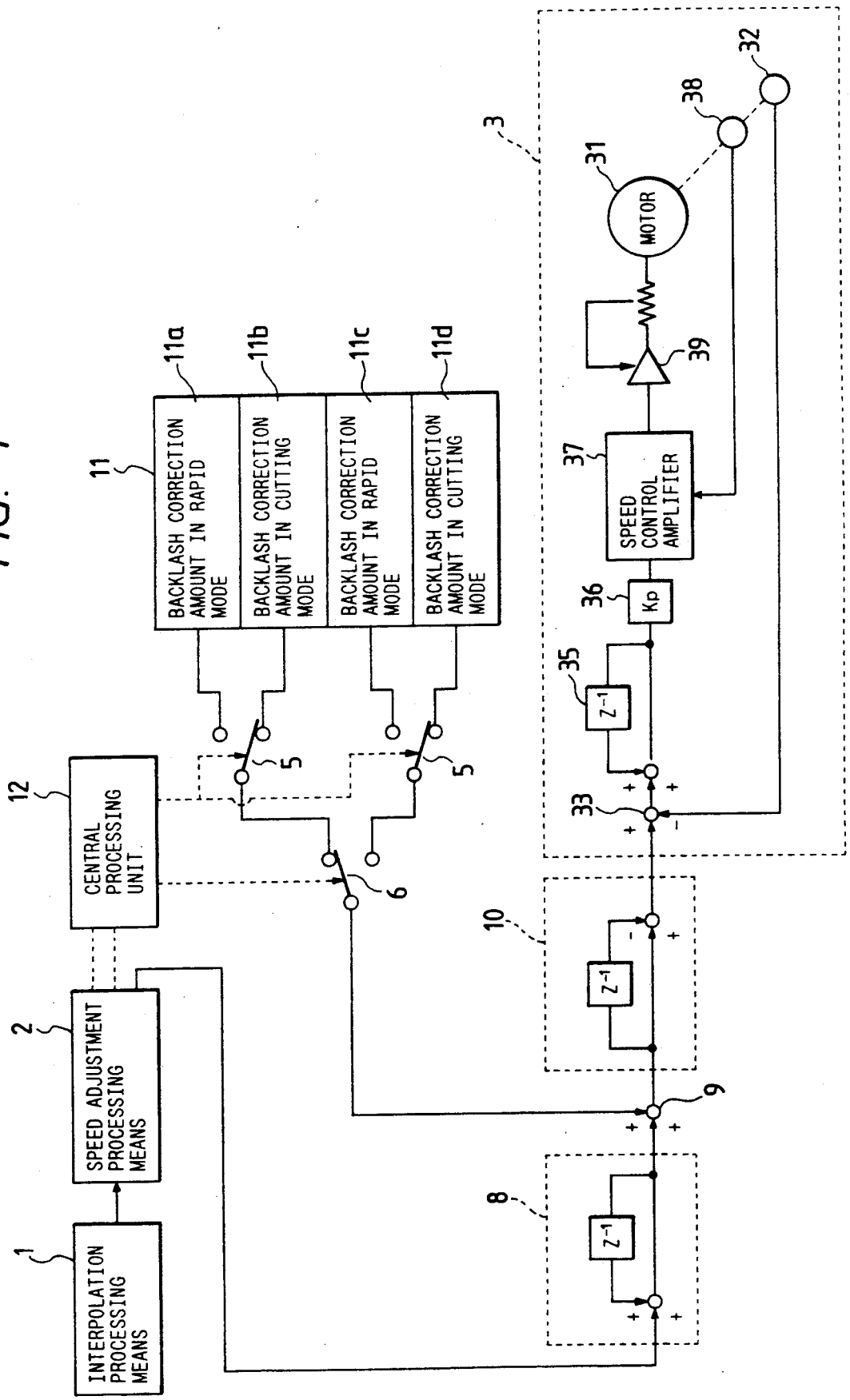
FIG. 1 is a block diagram showing a control system which is an embodiment of the invention.
Figure 6:
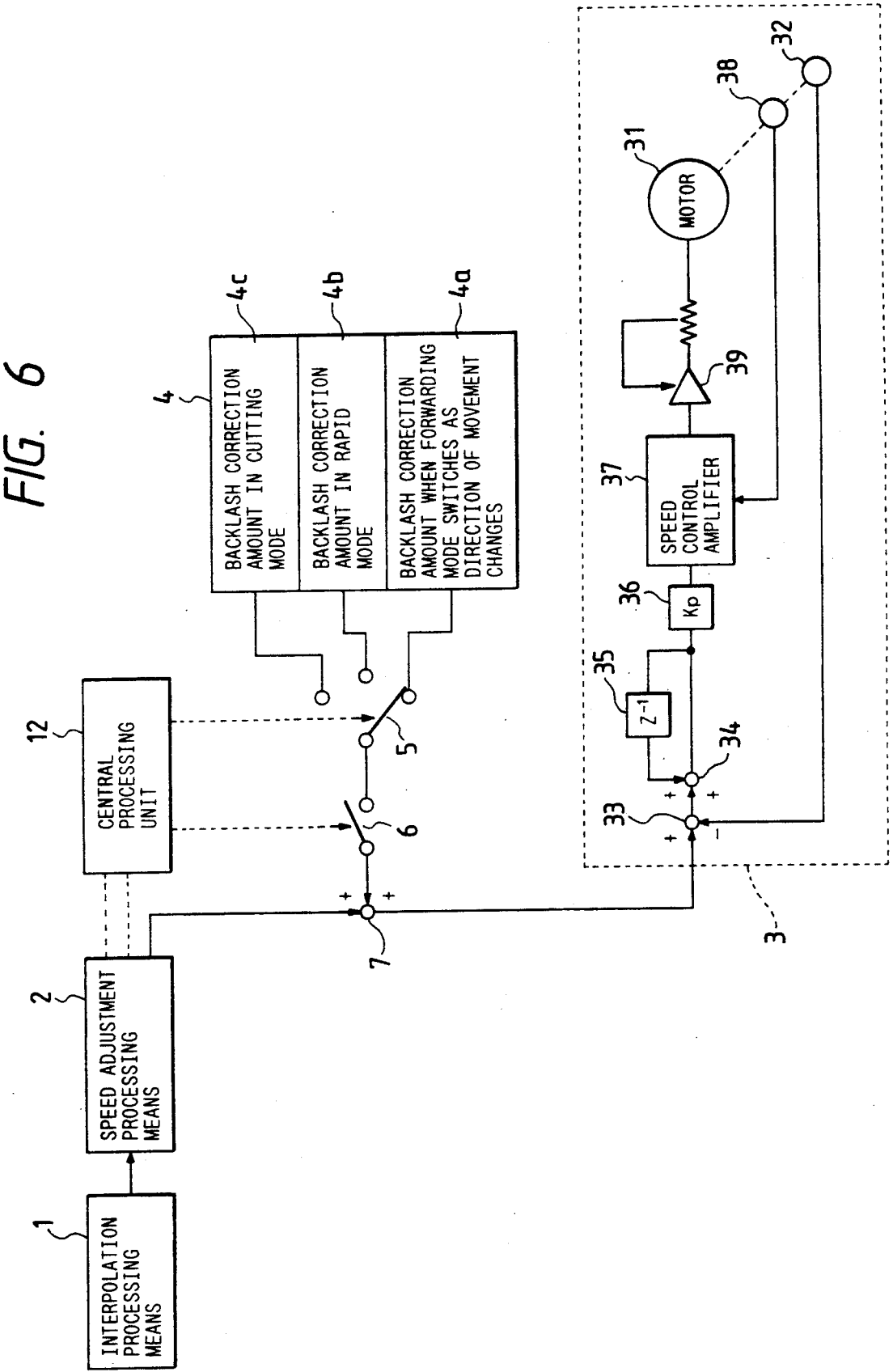
FIG. 6 is a block diagram showing a control system of a conventional example.
Figure 7:
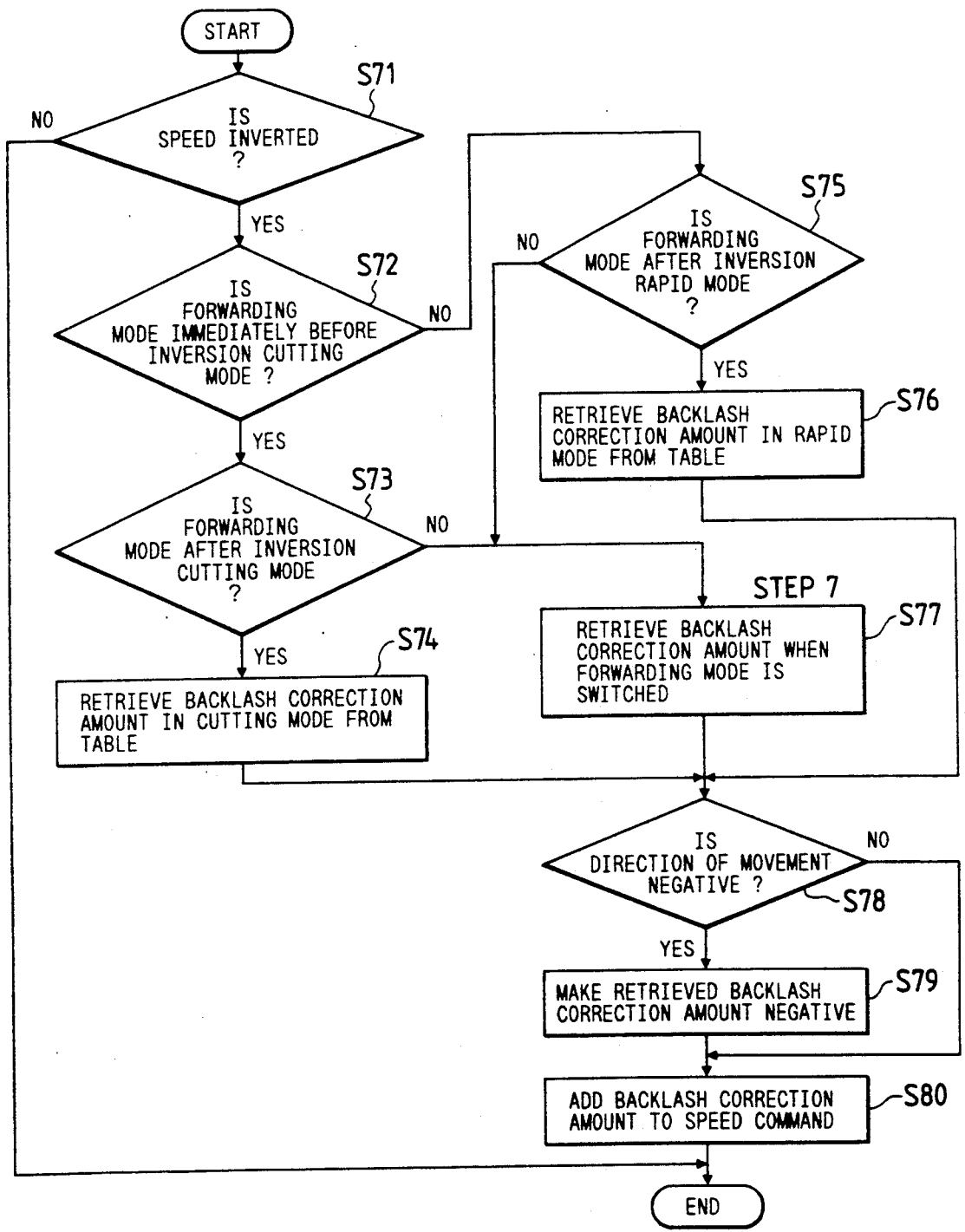
FIG. 7 is a flowchart showing an operation of the conventional example.
Figure 8A:
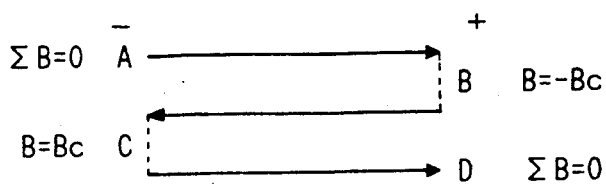
FIGS. 8(a), 8(b) and 8(c), and FIG. 9 are explanatory diagrams showing operating conditions of the conventional example, respectively.
Figure 8B:
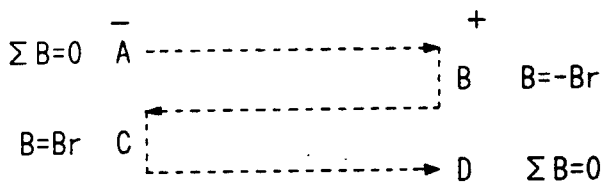
Figure 8C:
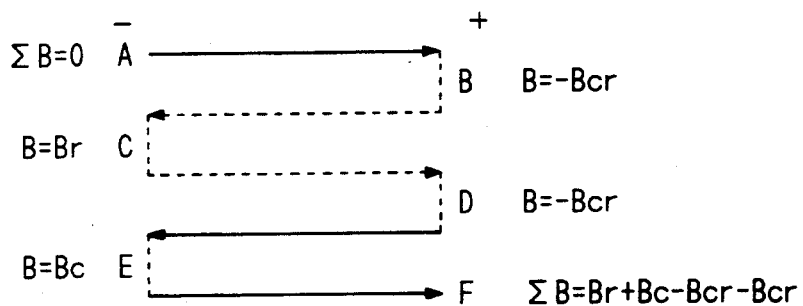
Figure 9:
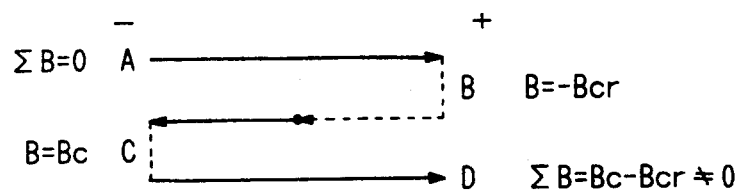

FIG. 1 is a block diagram showing a control system which is an embodiment of this invention. In the figure, interpolation processing means 1, speed adjustment processing means 2, a servo control section 3, reading means 5 and transfer means 6 are exactly the same as those of the conventional example shown in FIG. 6.

Reference numeral 8 designates means for calculating a position command value, by which a position command value is calculated by progressively adding each command value of incremental amount of movement obtained every sampling and transmitted from the speed adjustment processing means 2. The position command value calculating means includes an adder and integrator. Reference numeral 9 designates an adding unit, by which a position command correction value is calculated by adding a backlash correction amount stored in the memory table 11 to the position command value calculated by the position command value calculation means 8. Reference numeral 10 designates means for calculating a corrected incremental amount of movement, by which a previously sampled position command correction value is subtracted from the position command correction amount transmitted every sampling to thereby calculate a corrected incremental amount of movement of the control shaft every sampling.

The memory table 11 has a table 11a for storing backlash correction amounts Brp to be applied when the direction of movement of the control shaft is positive in the rapid mode a table 11b for storing backlash correction amounts Bcp to be applied when the direction of movement is positive in the cutting mode, a table 11c for storing backlash correction amount Brn to be applied when the direction of movement is negative in the rapid mode and a table 11d for storing backlash correction amounts Bcn to be applied when the direction of movement is negative in the cutting mode.

Figure 2A:
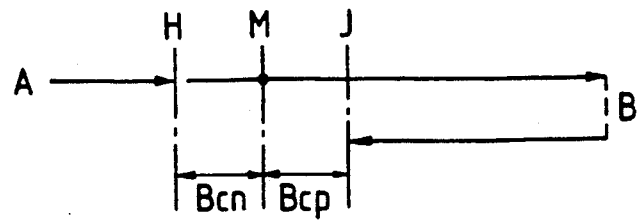
FIGS. 2(a) and 2(b) are explanatory diagrams showing an amount of backlash correction according to the embodiment.

The backlash correction amounts stored in this memory table 11 are defined as follows. For instance, as shown in FIG. 2(a), let it be supposed that the control shaft moves in the positive direction along the path starting from point A to a mechanical reference point M that is the point of return in the cutting mode. It stops once, and then resumes its movement in the positive direction up to point B, where it reverses the direction of its movement and thus moves in the negative direction up to the reference point M. If backlash is caused between points H and J, the distance between the reference point M and point H and that between the reference point M and point J are the backlash correction amounts Bcn and Bcp in the cutting mode.

Figure 2B:
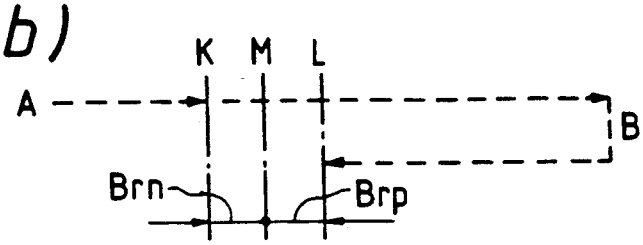

As shown in FIG. 2(b), let it be supposed that the control shaft moves from point A in the positive direction in the rapid mode and it reverses the direction of its movement at point B to continue moving in the negative direction. If a backlash is caused between point K and point L, the distance between the reference point M and point K and that between the reference point M and point L are the backlash correction amounts Brn and Brp in the rapid mode.

An operation of the mechanical error correction device thus constructed will be described with reference to the flowchart shown in FIG. 3.

An incremental amount of movement of the control shaft is approximated every sampling based on a machining configuration by the interpolation processing means 1 and the approximated value is fed to the speed adjustment processing means 2. The speed adjustment processing means 2 subjects the received incremental amount of movement to a speed adjustment, calculates a command value of incremental amount of movement and applies it to the position command value calculation means 8. On the other hand, the CPU 12 judges whether the direction of movement indicated by the command value of incremental amount of movement is positive or negative (Step S31). If it is positive, it is further judged whether the forwarding mode is the cutting mode or the rapid mode (Step S32). If it is the cutting mode, a backlash correction amount Bcp, to be used when the control shaft moves in the positive direction in the cutting mode, is retrieved from the table (11b) by the reading means (5) (Step S33). If the forwarding mode is the rapid mode, a backlash correction amount Brp, to be used when the control shaft moves in the positive direction in the rapid mode, is retrieved from the table (11a) (Step S34).

If the direction of movement is negative in the judgment in Step S31, it is judged whether the forwarding mode is the cutting mode or the rapid mode (Step S35). If it is the cutting mode, a backlash correction amount Bcn, to be used when the direction of movement is negative in the cutting mode, is retrieved from the table (11d) (Step S36). If the forwarding mode is the rapid mode, a backlash correction amount Brn, to be used when the direction of movement is negative in the rapid mode, is retrieved from the table (11c) (Step S37). Each of the backlash correction amounts thus retrieved is supplied to the adding unit 9 through the transfer means 6 every sampling.

In the meantime, the command value of incremental amount of movement of every sampling supplied from the speed adjustment processing means 2 is converted to a position command value by being progressively calculated by the position command calculation means 8. This position command value is applied to the adding unit 9, where it is added to a backlash correction amount supplied from the memory table to thereby produce a position command correction value from the adding unit (9) (Step S38).

Since each backlash correction amount is added to the position command value obtained every sampling, it is possible to prevent positional deviations attributable to the progressive calculation of correction amounts in the case where corrections are to be made repetitively.

The position command correction value produced by the adding unit 9, is applied to the corrected-incremental-amount of movement calculation means 10, where the difference between it and the previously sampled position command correction value is calculated to thereby obtain a corrected incremental amount of movement of the control shaft to be obtained every sampling. The obtained corrected incremental amount of movement is applied to the servo control section 3, which thereby performs position control of the motor 31. The above operation is repeated every sampling.

Although the case where the invention is applied to the backlash correction in the above embodiment, it may likewise be applied to the correction of lost motions which cause deviations at the stop position of the control shaft in both positive and negative directions during positioning.

Figure 4:
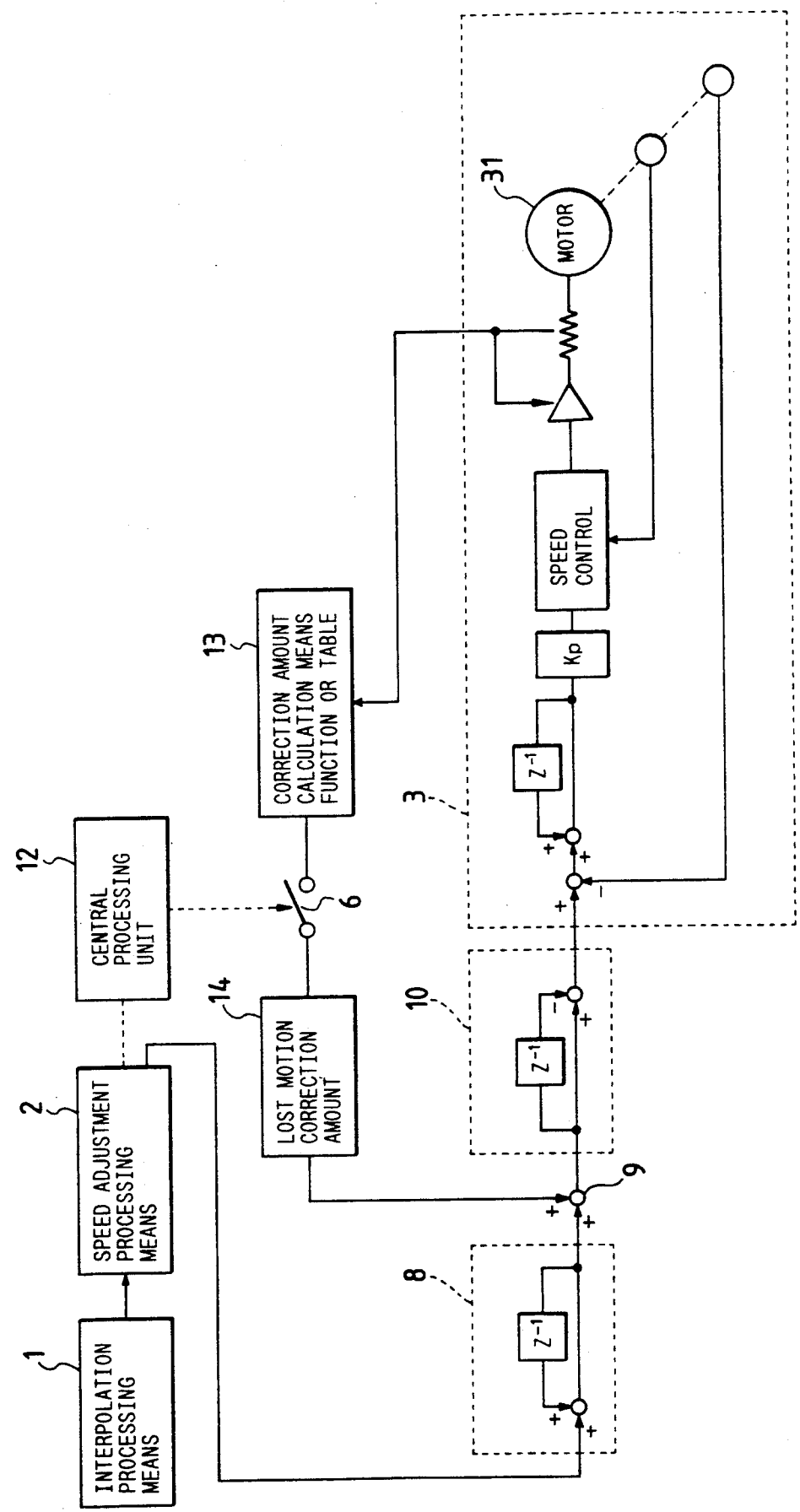
FIG. 4 is a block diagram showing a control system which is another embodiment of the invention.

FIG. 4 is a block diagram showing a control system for correcting lost motions. In the figure, reference numeral 13 designates a correction amount calculation means having either a function or functions, or a table or tables for obtaining the amount of correction of a lost motion, e.g., from a current feedback storing the most motion correction value calculated temporarily storing the lost motion correction value calculated by the correction amount calculation means 13, which value is minutely updated by the lost motion correction amount obtained by the correction amount calculation means 13 at a desired timing such as inversion of the direction of movement or stopping.

Figure 5:
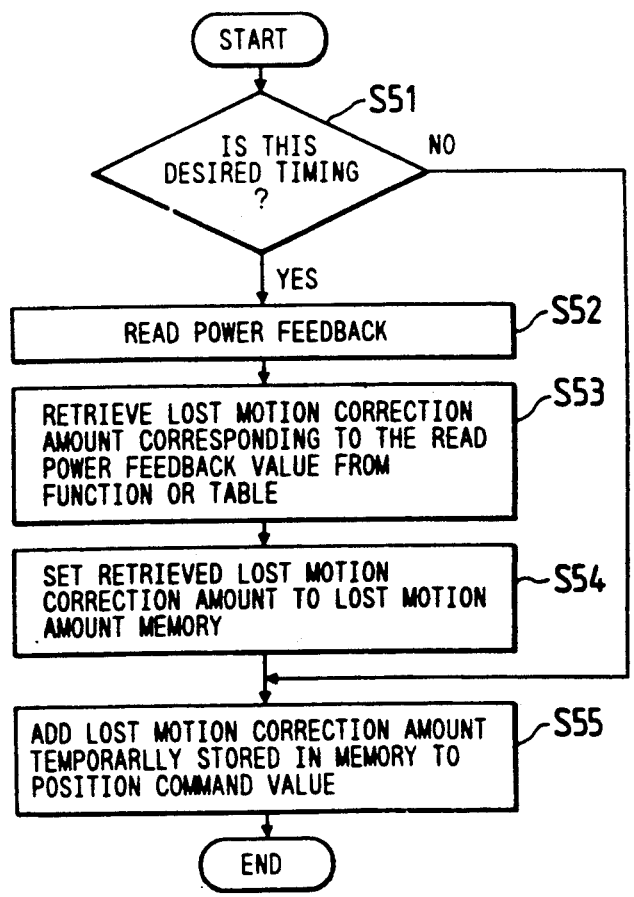
FIG. 5 is a flowchart showing an operation of the embodiment shown in FIG. 4.

An operation of the control system for correcting the lost motion thus constructed will be described with reference to the flowchart shown in FIG. 5.

In order to make a lost motion correction, it is judged whether or not it is the desired timing such as inversion of the direction of movement or stopping to update a lost motion correction amount stored in the memory 14 by the CPU 12 (Step S51). If it is the desired timing, a current feedback value of the servomotor 31 is, for instance, read by the correction amount calculation means 13 (Step S52). A lost motion correction amount is obtained from a function or functions, or a table or tables of the correction amount calculation means 13 based on the read current feedback value (Step S53). The obtained lost motion correction amount is set in the memory 14 to thereby update the stored lost motion correction amount (Step S54).

On the other hand, if it is not the desired timing for updating the lost motion correction amount, the lost motion correction amount stored in the memory 14 is kept unchanged. Thereafter, the lost motion correction amount stored in the memory 14 is supplied to the adding unit 9, where it is added to the position command value applied from the position command value calculation means 8, and the position command correction value thus obtained is produced form the adding unit 9. This process is performed every sampling to control the position of the servomotor 31.

As described in the foregoing pages, in this invention, the arrangement is made so that a mechanical error correction amount such as a backlash correction amount or a lost motion correction amount is added to a position command value, so that it is no longer necessary to judge conditions such as the forwarding mode immediately before the inversion of the direction of movement when making a backlash correction, thereby allowing a simple operation.

Further, the addition of the correction amount to the position command value prevents positional deviations due to progressive calculation of correction amounts even if an amount of correction is arbitrarily changed in the case where a number of corrections have to be made repetitively, thereby providing highly accurate positioning.

Moreover, a lost motion correction, in which a mechanical error whose amount of correction depends on the forwarding speed or lubricating conditions of the guide surfaces of a machine, must be corrected, can be processed in a simple manner.

What is claimed is:

1. A device for correcting mechanical errors in an NC machine, by which an incremental amount of movement of a control shaft is corrected based on an amount of correction of mechanical errors of said machine, and a corrected value is transmitted to a servo control section, said device comprising:

means for adjusting the incremental amount of movement of the control shaft calculated during each of a plurality of samplings by a speed adjustment value;

means for calculating a position command value by progressively adding a value of said incremental amount of movement subjected to said speed adjustment value;

means for obtaining a position command correction value by adding a predetermined amount of correction for mechanical error to said position command value calculated by said calculating means; and means for calculating a corrected incremental amount of movement by subtracting a previously calculated position command correction value from a currently calculated position command correction value, both calculated by said calculating means, and means for transmitting said corrected incremental amount of movement to said servo control section.

2. A device as claimed in claim 1, wherein said calculating means comprises an adder and an integrator.

3. A device as claimed in claim 1, further comprising a memory table for storing the mechanical error correction amount.

* * * * *